UNITED STATES PATENT OFFICE.

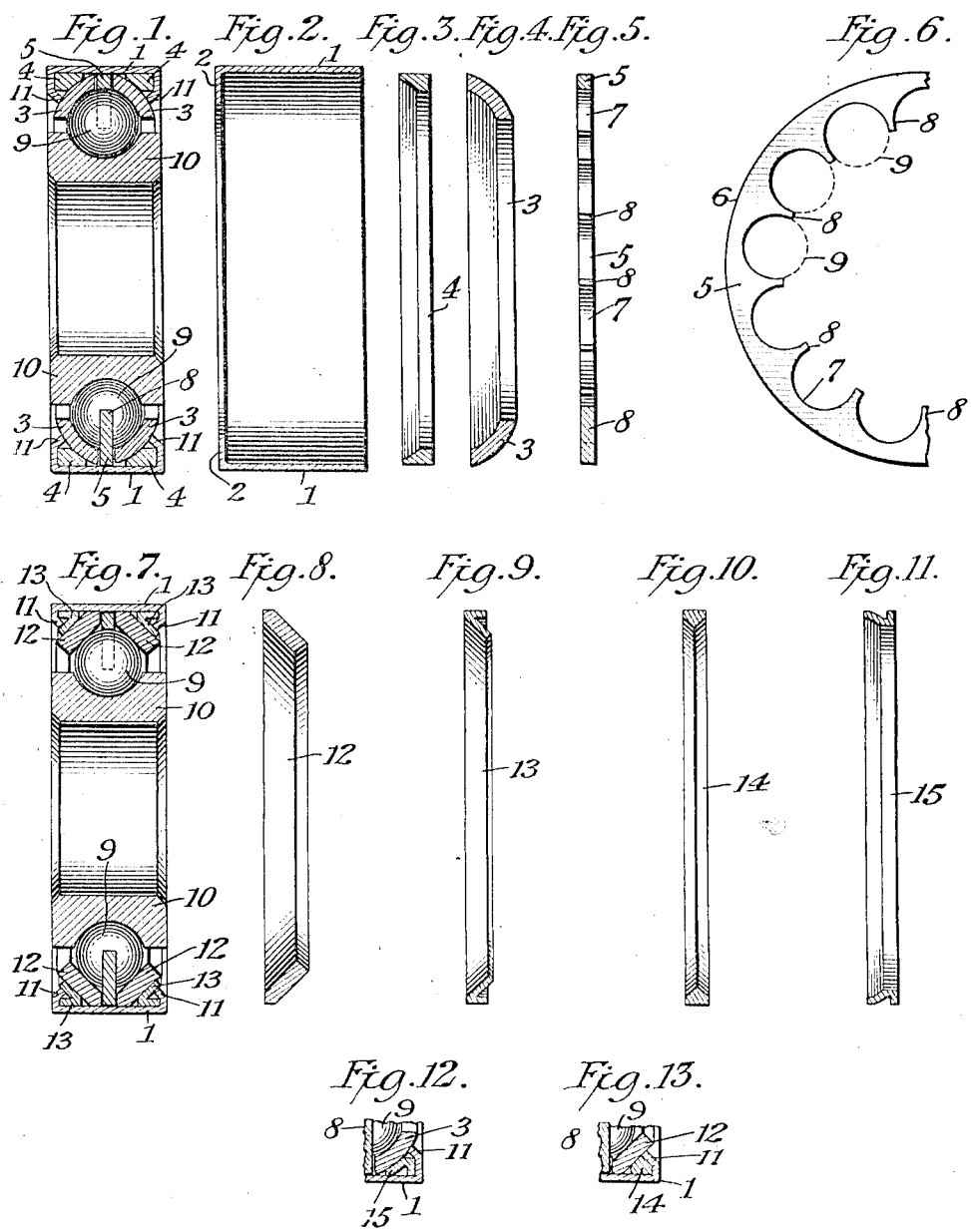
J. W. SCHATZ.
BALL BEARING.
APPLICATION FILED MAR. 12, 1913.
1,073,530. Patented Sept. 16, 1913.

JOHN W. SCHATZ, OF POUGHKEEPSIE, NEW YORK, ASSIGNOR OF ONE-THIRD TO HERMAN A. SCHATZ AND ONE-THIRD TO GROVER H. SCHATZ, BOTH OF POUGHKEEPSIE, NEW YORK.

BALL-BEARING.

1,073,530.  Specification of Letters Patent.  Patented Sept. 16, 1913.

Application filed March 12, 1913. Serial No. 753,723.

*To all whom it may concern:*

Be it known that I, JOHN W. SCHATZ, a citizen of the United States, and a resident of the city of Poughkeepsie, county of Dutchess, and State of New York, have invented a new and useful Improvement in Ball-Bearings, of which the following is a specification.

This invention is an improvement upon that for which I applied for Letters Patent of the United States on the seventh day of September, 1912, the application being Serial Number 719,044, and it consists in so constructing and assembling the parts that much interior space is saved, whereby I am enabled in a bearing of any given exterior diameter to include a greater number of balls, or an equal number of larger balls than has heretofore been possible.

The construction is also such that an inexpensive, yet effective "spacer" for the balls is incorporated in the bearing in such manner that it revolves with the balls, thus in addition to acting as a spacer, serving as an efficient means for lubricating the bearing.

The valuable features of my previous invention referred to above, that is to say, economy in construction and great strength and durabilty, are preserved, the bearings being self-contained and complete in all respects.

Generally stated, the bearing consists of a pair of cup rings provided with suitable reinforcing members which are inclosed within and held and supported by an exterior jacket, the cup rings being somewhat separated from each other so as to form an annular groove or channel between them, in which rests the outer edge of the ball spacing device in such manner that it is adapted to rotate with the balls. The cone or inner bearing and the cup rings or outer bearing of the balls and the balls themselves serve as a resistance or support during the forming or spinning in of the edges or flanges of the exterior jacket about and upon the inclosed parts so as to hold them firmly in position.

Referring to the drawings, Figure 1 is a vertical sectional view of a bearing embodying the invention; Fig. 2 is a vertical sectional view of a partly formed jacket; Fig. 3 is a vertical sectional view of one form of reinforcing piece; Fig. 4 is a vertical sectional view of one form of cup ring; Fig. 5 is a vertical sectional view taken edgewise of one form of flat spacer; Fig. 6 is a sidewise elevation of the spacer about half broken away; Fig. 7 is a vertical sectional view similar to Fig. 1, of a modified construction embodying the invention; Fig. 8 is a vertical sectional view of the form of cup ring embodied in Fig. 7; Fig. 9 is a vertical sectional view of a modified form of reinforcing piece, such as shown in Fig. 7; Fig. 10 is a modified form of reinforcing piece, such as shown in Fig. 13; Fig. 11 is a vertical sectional view of another modified form of reinforcing piece, such as shown in Fig. 12; Fig. 12 is a detail showing a construction similar to Fig. 1, in which, however, the reinforcing piece shown in Fig. 11 is shown. Fig. 13 is a detail showing a construction similar to Fig. 7, in which the reinforcing piece such as shown in Fig. 10 is employed.

In the drawings 1 represents the exterior jacket which in effect constitutes the outer frame for the support and retention in position of the parts. It is made of sufficiently soft metal, preferably steel, to permit of being drawn up, spun, or otherwise formed, as hereinafter described. In the first instance it may be a flat disk of steel, or, if preferred, a section of steel tubing. Whatever its initial shape may be, as the first operation a flange 2 is formed upon it so that the other parts during their assemblage will be supported by the flange until the final swaging or spinning operations take place.

3 is one of the cup rings. They are preferably continuous unbroken rings and two of them, as shown in Fig. 1, taken together, constitute the ball cup of the bearing. These rings are preferably dished somewhat, as shown best in Fig. 1, to conform to the curvature of the balls, because if so the area of contact between the balls and the cup is increased, thus tending to reduce wear and increase the load-carrying capacity. The cup rings may, however, be made in other forms or shapes, one of which is shown in Figs. 7 and 8.

4 is a reinforcing piece shown separately in Fig. 3. It is placed between the exterior jacket 1 and the cup rings, taking a bearing upon both in such manner as to firmly support the cup ring. I prefer that these reinforcing pieces should be punched from flat steel, although they may be made by winding suitable wire, preferably cold drawn wire, about an arbor and then cross sawing the several windings or convolutions, the ends thus formed being thereafter brazed or soldered together or not as preferred. The edge or part of the reinforcing pieces which bears against the adjoining cup ring may be given such shape or bevel as desired during the operation of drawing the wire, or during the punching or stamping operation, if made from flat metal, or otherwise, as desired.

5 is the ball spacer. It is preferably cut from flat sheet steel, as shown best in Fig. 6. being truly circular on its outer edge 6 and having recesses 7 cut in its inner edge, with centrally projecting parts 8, 8, between the recesses. The balls 9 are shown in three of these recesses.

10 is a cone or equivalent part of the bearing, which may be made hollow, as shown, thus adapting it to be placed upon a shaft or axis, or may be made of such other shape and have such other structural features as will adapt it to the use to which it is to be put.

A convenient and desirable method in which the parts as thus far described may be assembled, resulting in a complete, self-contained bearing, is as follows: The jacket is placed upon any flat surface with its flange 2 downward. One of the reinforcing pieces 4 is then dropped into the jacket, next one of the cup rings 3, next the cone or its equivalent 10, next the balls 9, next the spacer 5, care being taken that one of the balls is properly placed within each of the recesses 7 in the spacer, next the second cup ring 3, next the second reinforcing piece 4. The entire assemblage is then placed within a pair of suitably arranged dies or swaging devices, care being taken that all parts retain their proper location, whereby the outer edge or rim of the jacket is folded inwardly to form in the first instance a flange on that side similar to the flange 2 (see Fig. 2) and then the extreme edges of the flanges 11 (see Fig. 1) are still further turned inwardly, the parts being so proportioned that the inturned parts 11 shall rest against the exterior surfaces of the cup rings 3 and act as braces for them as shown in Fig. 1. If found more expedient, a suitably constructed and arranged spinning machine may be substituted for the dies or swaging devices.

It will be noted that a series of important advantages are secured from this construction. The balls, the cone and the cup rings serve as a resistance to the inward pressure due to the forming or spinning of the jacket about and against the reinforcing pieces and the cup rings, thus assuring accuracy in construction and the formation of the annular groove for the reception of the edge of the flat spacing ring. Also in as much as the cup rings extend radially out to the inner surface of the jacket, I secure the greatest possible ball space within the bearing, so that I can employ a greater number of balls of a given size than formerly, thus enabling the bearing to carry a heavier load, or I can employ larger balls in a bearing having the same exterior diameter than formerly, thus in both cases increasing the efficiency and desirability of the structure. Also the ball spacer being made in the form of a flat circular plate, its outer edge is adapted to enter into the circumferential groove between the outer edges of the two cup rings and the inner surface of the jacket and rest loosely therein, so that it will rotate with the balls, and in as much as the inwardly projecting parts 8, 8, of the spacer need be only thick enough to effectively separate the balls to prevent their clicking against each other, that there is practically no reduction or at least but little reduction in the number of balls that the bearing can contain, they being substantially in continuous series, thereby making a much stronger silent type than is possible by other methods. From this construction also flows another very important advantage, that is to say, the lubricant applied to the bearing will settle in the lower arc of the bearing and in as much as the jacket is imperforate, having no holes, cracks or seams in it, of course the oil will be retained there and as the spacer is carried around in continuous revolution by and with the balls, of course it acts as an automatic oil feeder, carrying the lubricant to the upper parts of the bearing, so that it will drop upon the balls and the cone or its equivalent, thus permanently maintaining the parts in a thoroughly lubricated condition. The employment of the reinforcing pieces 4 and the formation of the flanges or edges of the jacket in such manner as to embrace them and also extending the jacket so that its edges take a bearing upon and act as braces for the cup rings, are very valuable features of my invention, because they effect great strength and solidity in the structure as a whole and prevent deformation of the cup rings.

In Figs. 7 to 13 I show modified constructions of certain of the parts, their function and method of operation being, however, substantially the same as those above described. I wish it understood, however, that I by no means limit myself to the forms or shapes of the parts illustrated in the drawings and described in this specification, for it will be obvious to those who are familiar with such matters that modifications may be made in the details of construction and yet the essentials of the invention be employed.

In Figs. 7 and 8 the cup rings are designated 12. Their function is obviously the same as the cup rings 3 of the other figures, but in these figures, instead of being dished or made concave to coincide with the spherical shape of the balls, they are straight sided as shown. This has the advantage of slightly greater economy in construction and yet has the disadvantage that the area of contact between the cup rings and the balls is materially less than that shown in Fig. 1, thus tending to reduce the life of the bearing. For many purposes, however, the bearing shown in Fig. 7 is desirable. In this figure also and in Fig. 9, I show a modified construction of the reinforcing pieces. In these figures they are designated 13. They may advantageously be made of sheet metal formed up into the shape shown, by suitable forming dies or otherwise, as preferred, and it will be noted that the inwardly bent edges 11 of the jacket in this construction are made to take a bearing against one of the members of the reinforcing pieces instead of the outer surface of the cup rings, as shown in Fig. 1.

In Fig. 10 I show at 14 still another form of reinforcing piece. This form may advantageously be made from specially rolled or drawn steel wire and the method of assembling it with the other parts is shown in Fig. 13. In Fig. 11 I show at 15 still another form of reinforcing piece and the method of assembling it and the other parts is illustrated in Fig. 12.

As stated above, the various forms illustrated and described herein for the construction and assemblage of the parts are intended as illustrative merely of the general construction of the parts and the functions they respectively are to perform because other forms and other methods and co-active arrangement or association of them together will at once occur to those who are familiar with this art. I therefore do not limit myself in any respect to the details described and illustrated. Furthermore when in the claims hereof I refer to a cone, I wish it understood that I do not limit myself to the annular structure illustrated in Figs. 1 and 7 of the drawings hereof because, as is well known, the construction of this part of the apparatus will in many instances be different from that shown, depending upon the special use to which the bearing is put or the special structure in which it is to be used.

I claim:

1. A self-contained ball bearing, comprising an exterior supporting jacket, a pair of cup rings, reinforcing pieces between the cup rings and the jacket, the edges of the latter being bent inwardly to brace the cup rings, balls and a cone.

2. A self-contained ball bearing, comprising an exterior supporting jacket, a pair of cup rings, reinforcing pieces between the cup rings and the jacket, the edges of the latter being bent inwardly to brace the cup rings, balls, a cone and a spacing ring for the balls located radially between the cup rings.

3. In a ball bearing, an exterior supporting jacket, a pair of cup rings, reinforcing pieces between the cup rings and the jacket, the edges of the jacket being turned inwardly to embrace and hold the reinforcing pieces in position, balls and a cone.

4. In a ball bearing an exterior supporting jacket, a pair of cup rings, the outer edges whereof rest upon the jacket, reinforcing pieces between the cup rings and the jacket, the edges of the jacket being turned inwardly to inclose the reinforcing pieces and extended to act as braces for the cup rings and reinforcing pieces, balls and a cone.

5. A self-contained ball bearing, comprising an exterior supporting jacket, a pair of cup rings, reinforcing pieces between the cup rings and the jacket, the edges of the jacket being turned inwardly to act as a brace for the reinforcing pieces and the cup rings, a plate-like spacing ring having recesses in its inner edge, each adapted to receive one of the balls of the series, balls and a cone.

6. In a ball-bearing, an exterior supporting jacket, a pair of cup rings, reinforcing pieces for the cup rings, each having a surface adapted to fit against the exterior of one of the cup rings and other surfaces adapted to fit against and be supported by the exterior jacket.

In testimony whereof I have signed my name to this specification in the presence of two subscribing witnesses.

JOHN W. SCHATZ.

Witnesses:
H. A. SCHATZ,
GEO. H. WILLIAMS.